C. R. STENBERG.
DIRIGIBLE HEADLIGHT.
APPLICATION FILED JAN. 9, 1917.
1,224,804.
Patented May 1, 1917.
2 SHEETS—SHEET 1.
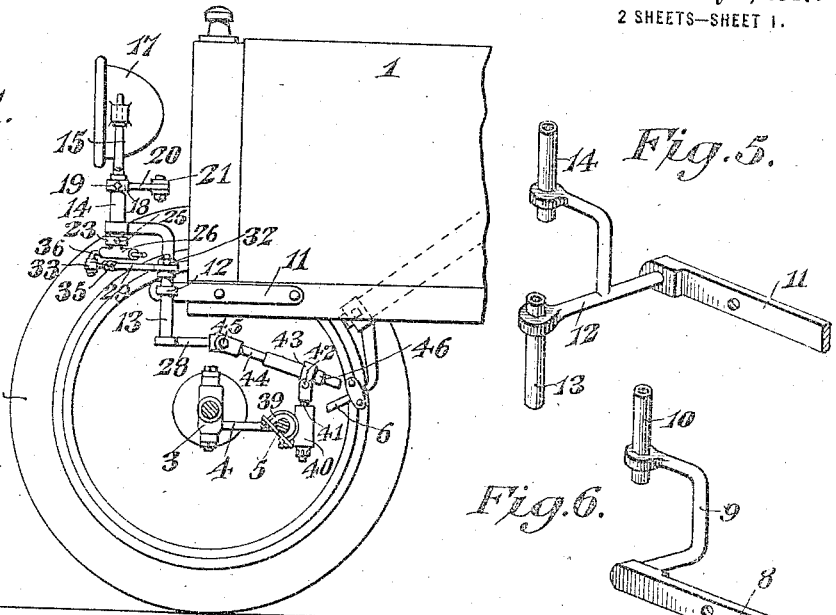
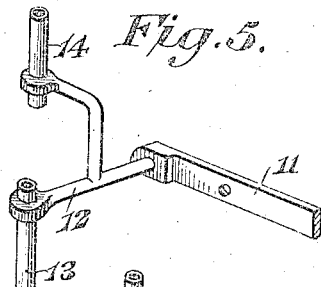
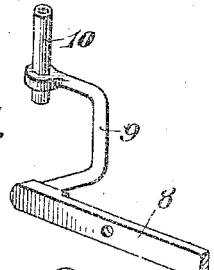
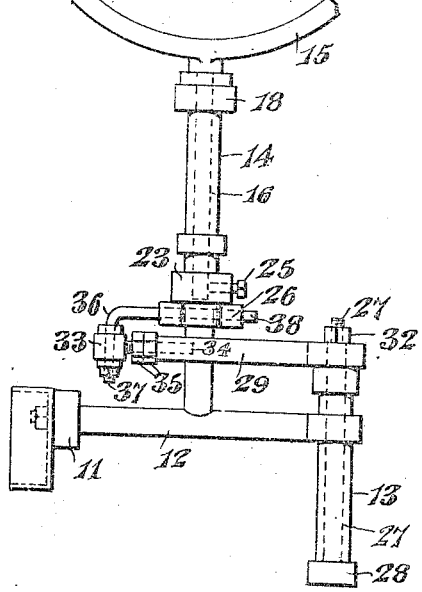
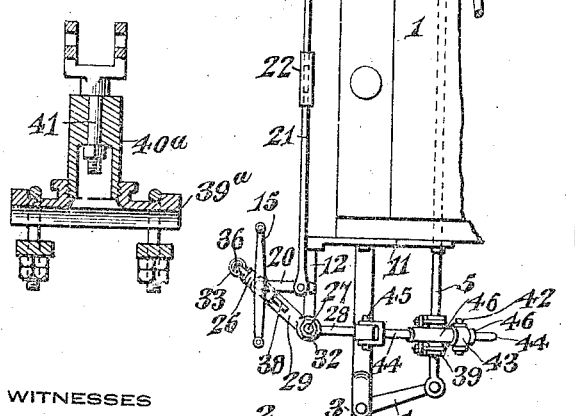
WITNESSES
INVENTOR
C. R. Stenberg,
BY
ATTORNEY

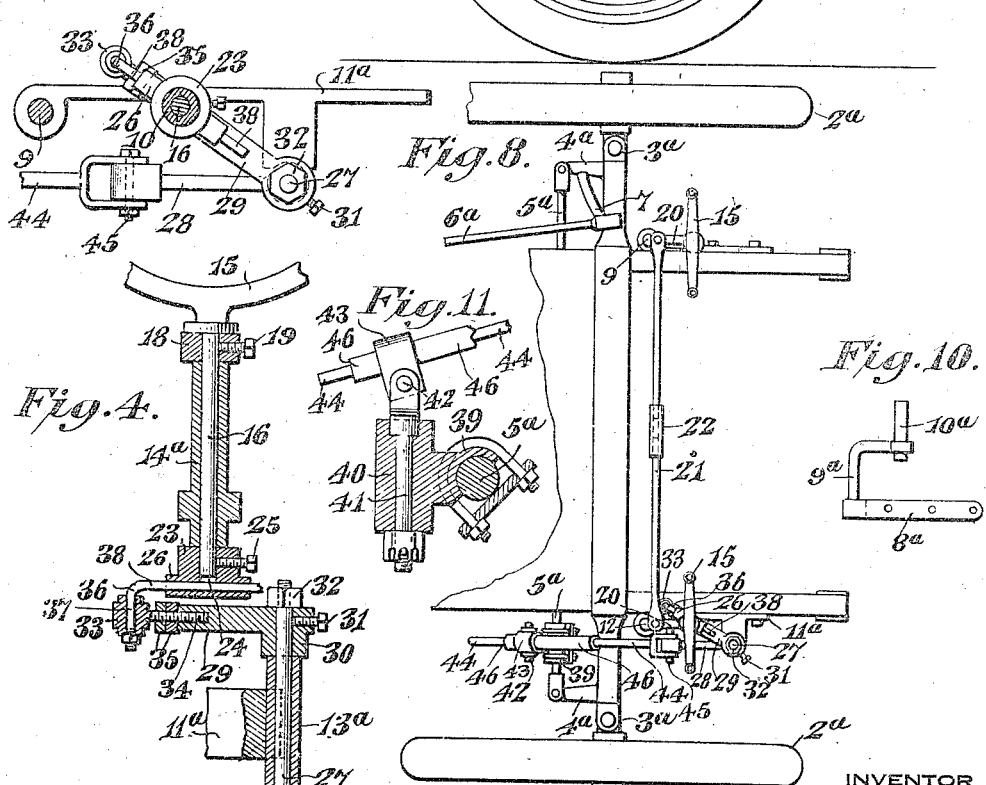

UNITED STATES PATENT OFFICE.

CHARLES ROBERT STENBERG, OF GENOA, NEBRASKA.

DIRIGIBLE HEADLIGHT.

1,224,804.  Specification of Letters Patent.  Patented May 1, 1917.

Application filed January 9, 1917. Serial No. 141,459.

*To all whom it may concern:*

Be it known that I, CHARLES R. STENBERG, a citizen of the United States, residing at Genoa, in the county of Nance and State of Nebraska, have invented a new and useful Dirigible Headlight, of which the following is a specification.

This invention relates to dirigible headlights for automobiles.

The object of the invention is to provide a construction which can be easily adjusted to automobiles of different makes, which is easy to operate, and which can also be adjusted to vary the angular movement or throw of the lamps when they are actuated by the steering gear.

As in most constructions of this nature, the present invention also contemplates to provide actuating devices which will not interfere with the spring action of the automobile.

In the accompanying drawings illustrating one embodiment of the invention:

Figure 1 is a side elevation of the forward portion of a Ford car, illustrating the application of my invention thereto.

Fig. 2 is a plan view of the same.

Fig. 3 is a detail front elevation on an enlarged scale of part of the actuating mechanism for the right hand lamp looking toward the rear.

Fig. 4 is a sectional elevation of the same with parts of the framework omitted for the sake of clearness.

Fig. 5 is an enlarged perspective view of the bracket used at one side of the Ford car illustrated in Fig. 1.

Fig. 6 is an enlarged perspective view of the bracket used at the opposite side of the Ford car.

Fig. 7 is a side elevation of the forward portion of a Reo or Overland car, showing the application of my invention thereto.

Fig. 8 is a plan view thereof.

Fig. 9 is a sectional plan view upon an enlarged scale, showing a part of the actuating mechanism journaled in the bracket illustrated in Fig. 7.

Fig. 10 is a side view of a bracket used in the make of car illustrated in Figs. 7 and 8.

Fig. 11 is a detail sectional view on an enlarged scale of a clip adapted to be attached to the connecting rod of the steering gear.

Fig. 12 is a detail sectional view on an enlarged scale illustrating a modified form of the same.

My invention is applicable to all makes of automobiles, and I have herein illustrated its application to a Ford, Figs. 1 and 3, and to a Reo, Figs. 7 and 8. Referring to Figs. 1, 2, 7 and 8; 1, 1$^a$ indicate the bodies or frames of the automobiles; 2, 2$^a$ the wheels connected through springs to the bodies; 3, 3$^a$ the knuckle joints; 4, 4$^a$ the arms connected to the wheels at the joints; 5, 5$^a$ the rods connecting the arms, whereby the wheels can be moved simultaneously; and 6, 6$^a$ the steering gears which are usually connected to the connecting rods, as shown at 7, in Fig. 2, or as illustrated in Fig. 8.

Referring to Figs. 1 and 2, I have there illustrated the brackets used in connection with a Ford car. At one side of the automobile is attached a bracket 8 which projects in front of the hood and is provided with an upwardly extending arm 9 provided with a vertical bearing sleeve 10. Upon the opposite side of the hood is a bracket 11 provided with an outwardly and transversely extending arm 12 at the outer end of which is a vertical bearing sleeve 13. At an intermediate portion of the arm 12 is fixed a second vertical bearing sleeve 14, which is located above, in front of and inwardly of the bearing sleeve 13. These brackets, which are applicable to Ford cars, are illustrated in Figs. 5 and 6.

Where a different make of car is used, such as for instance, the Reo, brackets illustrated in Figs. 7, 8, 9 and 10 are used. Referring to Fig. 10, I have there shown a bracket 8$^a$ provided with an upstanding arm 9$^a$ terminating in a vertical bearing sleeve 10$^a$. This bracket is attached at one side of the hood upon one of the forwardly projecting frame members of the automobile. At the opposite side of the hood upon the other frame member is located a bracket 11$^a$ provided at its forward end with a vertically extending bearing sleeve 13$^a$ and at its rear end with a vertical bearing sleeve 14$^a$, arranged inwardly and above the sleeve 13$^a$.

The bearing sleeves 10, 14 or 10$^a$, 14$^a$ are provided with lamp yokes 15 having vertically extending shafts 16 journaled therein, see Fig. 4. A lamp 17 is attached to each yoke.

Adjustably fixed to the shafts 16 above their bearing sleeves are collars 18, which are secured to the shafts by means of set screws 19. These collars are provided with outwardly projecting arms 20 connected together by a cross rod 21, the length of which is adjustable, by means of the turn-buckle 22. By the above arrangement, both lamps will move in unison and turn in the same direction when actuated.

The lower end of the shaft 16, which is journaled in the bearing sleeve 14 or 14ª is provided with a cap 23 Fig. 4, having a bore 24 into which the end of the shaft projects. This cap is provided with a set screw 25 for adjustably securing the same to the end of the shaft 16. The lower portion of the cap is provided with a transversely extending tube or sleeve 26, the purpose of which will be described more fully hereinafter.

Rotatably journaled within the bearing 13 or 13ª is a shaft 27 Fig. 4, provided at its lower end with an arm 28 fixed thereto and extending rearwardly. At the upper end of the shaft 27 above the bearing sleeve is an arm 29 provided with a collar 30 encircling the shaft and adjustably held thereon by means of the set screw 31. The shaft 27 with its arms is retained within the bearing by means of a nut 32 at the upper end thereof, as illustrated in Fig. 4.

The free end of the arm 29 is provided with a bearing 33 having a screw-threaded bolt 34 adjustably mounted upon the end of the arm, whereby the distance of the bearing from the shaft 27 may be adjusted. This bearing is held in its several adjusted positions by means of lock nuts 35. The arm 29 lies in a plane slightly below the plane of the tube 26. An angular connecting rod 36 is provided with a vertically extending portion 37 journaled within the bearing 33, and with a horizontally extending portion 38 slidably mounted within the tube 26.

Mounted upon the connecting rod 5 or 5ª is a clip 39 provided with a bearing 40 located at the rear of the shaft and as far away from the lamp shafts as possible. The construction of this clip and bearing can vary, but the preferred form is that shown in Fig. 11. The form shown in Fig. 12 comprises the clip 39ª and the bearing 40ª mounted in a different angular relation to the clip from the bearing illustrated in Fig. 11. The form shown in Fig. 12 can be used on some styles of automobiles.

Journaled within the bearing 40 is a shaft 41, as clearly shown in Fig. 11. Pivoted to the upper end of the shaft 41 upon a horizontal transversely extending axis 42 is a sleeve 43 extending from front to rear. A rod 44 is pivotally connected at 45 to the free end of the arm 28, the pivotal connection being on an axis extending transversely, horizontally and parallel to the axis 42. The opposite end of the rod 44 telescopes within the sleeve 43, as indicated at 46. This provides a flexible actuating device for turning the lamps.

The connection between the connecting rod 5 or 5ª and the arm 28, it will be seen, is one which allows for the vibration of the body relatively to the wheels on account of the springs. The connection between the shaft 27 and the shaft 16 is such as to allow a wide range of adjustment, as will be evident. When the connecting rod 5 or 5ª is moved either one way or the other, it will be seen that the shaft 16 will be rotated. This movement will be communicated to both lamps through the connecting rod 21. It is thought that the operation of my improved construction will be apparent from the above description and needs no further elaboration.

Throughout the views the wheels and lamps are shown directed for travel in a straight line. When in this position the arm 29 and tube 26 are parallel to each other and arranged one above the other substantially as shown. By adjusting the bearing 33 the throw or angular adjustment of the lamps around their axes when the wheels turn can be varied.

While I have shown and described one embodiment of my invention, it is to be understood that I do not desire to be limited to the details of construction herein shown and described for obvious modifications will be apparent to any one skilled in the art.

What is claimed is:—

1. In a device of the character described, a bracket having a pair of spaced bearing sleeves fixed thereto and adapted to be attached to the frame of an automobile, a shaft journaled in one of said sleeves and provided with a lamp at its upper end, a shaft journaled in the other of said sleeves and provided with arms at its opposite ends, a connecting rod pivoted to the upper of said arms and having a sliding engagement with the lower end of said first mentioned shaft, and a flexible actuating device attached to the lower of said arms and adapted to be connected to the steering gear, whereby the lamp can be turned simultaneously with the wheels.

2. In a device of the character described, a bracket having a pair of spaced bearing sleeves and adapted to be attached to the frame of an automobile, a shaft journaled in one of said sleeves and provided with a lamp at its upper end and a transversely extending tube at its lower end, a shaft journaled in the other of said sleeves and provided with an arm at its upper end lying in a plane slightly below said tube, said tube being arranged parallel with said arm in one adjustment of the lamp, the free end of said arm being provided with a bearing, an angular connecting rod having a vertical portion pivoted in the bearing of said arm, and a horizontal portion telescoping said tube and slidably engaging the same, and an actuating device connected to the lower end of said last-mentioned shaft for actuating the lamp.

3. In a device of the character described, a bracket having a pair of spaced bearing sleeves fixed thereto and adapted to be attached to the frame of an automobile, a shaft journaled in one of said sleeves and provided with a lamp at its upper end, a shaft journaled in the other of said sleeves and provided with arms at its opposite ends, a bearing adjustably mounted upon the free end of the upper of said arms, an angular connecting rod having a vertical portion pivotally mounted in said bearing and a horizontally extending portion slidably engaging the lower end of said first mentioned shaft, and a flexible actuating device attached to the lower of said arms and adapted to be connected to the steering gear whereby the lamp can be turned simultaneously with the wheels.

4. In a device of the character described, a bracket having a pair of spaced bearing sleeves fixed thereto and adapted to be attached to the frame of an automobile, a shaft journaled in one of said sleeves and provided with a lamp at its upper end, a cap adjustably mounted upon the lower end of said shaft and provided with a radially extending tube, a shaft journaled in the other of said sleeves and provided with arms at its opposite ends, the upper of said arms being rotatably adjustable thereon, an adjustable bearing mounted upon the free end of the upper of said arms, an angular connecting rod provided with a vertical portion pivoted in said bearing and with a horizontally extending portion telescoping said tube, and a flexible actuating device attached to the lower of said arms and adapted to be connected to the steering gear whereby the lamp is turned simultaneously with the wheels of the automobile.

5. In a device of the character described, a pair of spaced bearing sleeves, means attached to the frame of an automobile for supporting the sleeves in different vertical and horizontal planes, a vertical shaft journaled in the upper one of said sleeves and connected at its upper end to a lamp, a second vertical shaft journaled in the lower sleeve and provided with a pair of arms, said arms occupying different horizontal planes, a bearing connected to the upper arm, an angular connecting rod having a vertical portion journaled in the bearing and a horizontal portion telescoping with a part connected to the lower end of the first-mentioned shaft, and actuating means connecting the steering gear with the lower one of said arms.

6. In a device of the character described, a pair of spaced bearing sleeves, means attached to the frame of an automobile for supporting the sleeves in different vertical and horizontal planes, a vertical shaft journaled in the upper one of said sleeves and connected at its upper end to a lamp, a second vertical shaft journaled in the lower sleeve and provided with a pair of arms, said arms occupying different horizontal planes and extending in opposite directions, actuating means connecting the lower one of said arms with the steering gear, and connecting means between the upper arm and the lower end of the first-mentioned shaft, said means including a telescopic and a pivotal connection with means for adjusting the same.

In testimony that I claim the foregoing as my own, I have hereto affixed my signature in the presence of two witnesses.

CHARLES ROBERT STENBERG.

Witnesses:
   ARTHUR O. WHITE,
   R. A. McMILLAN.